United States Patent [19]

Sakurai et al.

[11] Patent Number: 4,932,493
[45] Date of Patent: Jun. 12, 1990

[54] IGNITION SWITCH, BRAKE AND GEARSHIFT INTERLOCKS FOR A VEHICLE AUTOMATIC TRANSMISSION

[75] Inventors: Ushio Sakurai; Hiroshi Nakatsuka; Takashi Yoshimura, all of Hiroshima, Japan

[73] Assignee: Mazda Motor Corporation, Hiroshima, Japan

[21] Appl. No.: 331,134

[22] Filed: Mar. 31, 1989

[30] Foreign Application Priority Data

Apr. 6, 1988 [JP] Japan .................. 63-83047

[51] Int. Cl.⁵ .................. B60D 1/12; B60K 41/26; F16D 41/24
[52] U.S. Cl. .................. 180/271; 192/4 A; 74/850; 70/248
[58] Field of Search .................. 70/247, 248, 252; 192/4 A; 74/850, 878; 180/271

[56] References Cited

U.S. PATENT DOCUMENTS

| | | | |
|---|---|---|---|
| 4,235,123 | 11/1980 | Simancik et al. | 70/247 X |
| 4,474,085 | 10/1984 | DeVogelaere et al. | 70/248 X |
| 4,759,203 | 7/1988 | Lieb et al. | 70/252 X |
| 4,768,610 | 9/1988 | Pagel et al. | 192/4 A X |
| 4,821,605 | 4/1989 | Dzioba | 192/4 A X |
| 4,854,193 | 8/1989 | Newman et al. | 74/850 |

FOREIGN PATENT DOCUMENTS

| | | | |
|---|---|---|---|
| 59-176253 | 11/1984 | Japan. | |
| 60-135352 | 7/1985 | Japan. | |
| 116163 | 6/1986 | Japan | 180/336 |
| 62-202433 | 12/1987 | Japan. | |

Primary Examiner—Dwight G. Diehl
Assistant Examiner—Khoi Q. Ta
Attorney, Agent, or Firm—Fleit, Jacobson, Cohn, Price, Holman & Stern

[57] ABSTRACT

A gear shift device for a vehicle automatic transmission has a gear shift lever for placing an automatic transmission of an automotive vehicle in any desired gear range. The gear shift device further has an electrically controlled shift lock mechanism for locking the gear shift lever so that the transmission is fixed in a park gear range when a brake pedal is released, and for enabling the gear shift lever to operate when the transmission is in the park gear range, when an ignition key is set and the brake pedal is pressed. A mechanically operated interlock mechanism is provided for enabling the ignition key to be pulled out when shifting of the gear shift lever has placed the transmission in the park gear range.

8 Claims, 6 Drawing Sheets

IGNITION SWITCH, BRAKE AND GEARSHIFT INTERLOCKS FOR A VEHICLE AUTOMATIC TRANSMISSION

BACKGROUND OF THE INVENTION

1. Field of the Invention

The present invention relates to a gear shift device for a vehicle automatic transmission, and more particularly to an interlock and shift lock device for a gear shift lever.

2. Description of Related Art

A known gear shift device for a vehicle automatic transmission provides an interlock or anti-theft lock device which cooperates with a gear shift lever. The interlock device disables the gear shift lever, when the lever is in a parking position, and prevents it from shifting the transmission when the engine is switched off. The device also enables an ignition key to be pulled out from an ignition assembly when the gear shift lever has been placed in the parking position. Such gear shift devices are disclosed, for example, in Japanese Unexamined Patent Publication No. 60-135,352, published July 18, 1985, and Japanese Unexamined Utility Model Publication No. 59-176,253, published Nov. 26, 1984.

Another known gear shift device for a vehicle automatic transmission provides a shift lock device which cooperates with the gear shift lever for disabling the gear shift lever, when the lever is in a parking position, to prevent the gear shift lever from shifting whenever a brake pedal is released, and for enabling the gear shift lever, when the lever is in the parking position, to be moved to other positions upon depression of the brake pedal. Such a gear shift device is disclosed in, for example, Japanese Unexamined Utility Model Publication No. 62-202,433, published Dec. 24, 1987. It should be noted that a gear shift device cooperating systematically with both an interlock device and a shift lock device is desired to improve the safety of the gear shift device in operation.

It is, therefore, an object of the present invention to provide a gear shift device which includes both an interlock device and a shift lock device which are simple in construction and effective to increase the operation safety of the shift device.

SUMMARY OF THE INVENTION

The present invention is directed to a gear shift device for placing or shifting an automatic transmission for an automotive vehicle in any desired gear range by operating a gear shift lever.

In a specific embodiment of the present invention, the gear shift device comprises electrically controlled shift lock means for locking the gear shift lever in a parking range selecting position when a brake pedal is released, and for enabling the gear shift lever to shift from the parking range selecting position when a key has been turned and the brake pedal pressed. Mechanically operated interlock means allow an ignition key to be pulled out from the ignition switch only when the gear shift lever is in the parking range selecting position. According to the present invention, the gear shift device provides both interlock means and a shift lock means of simple construction, thereby greatly improving safety.

BRIEF DESCRIPTION OF THE DRAWINGS

The above and other objects and features of the present invention will become apparent from the following detailed description considered in conjunction with the embodiments of the invention illustrated in the accompanying drawings, in which.

DESCRIPTION OF THE PREFERRED EMBODIMENT

Figure 1:
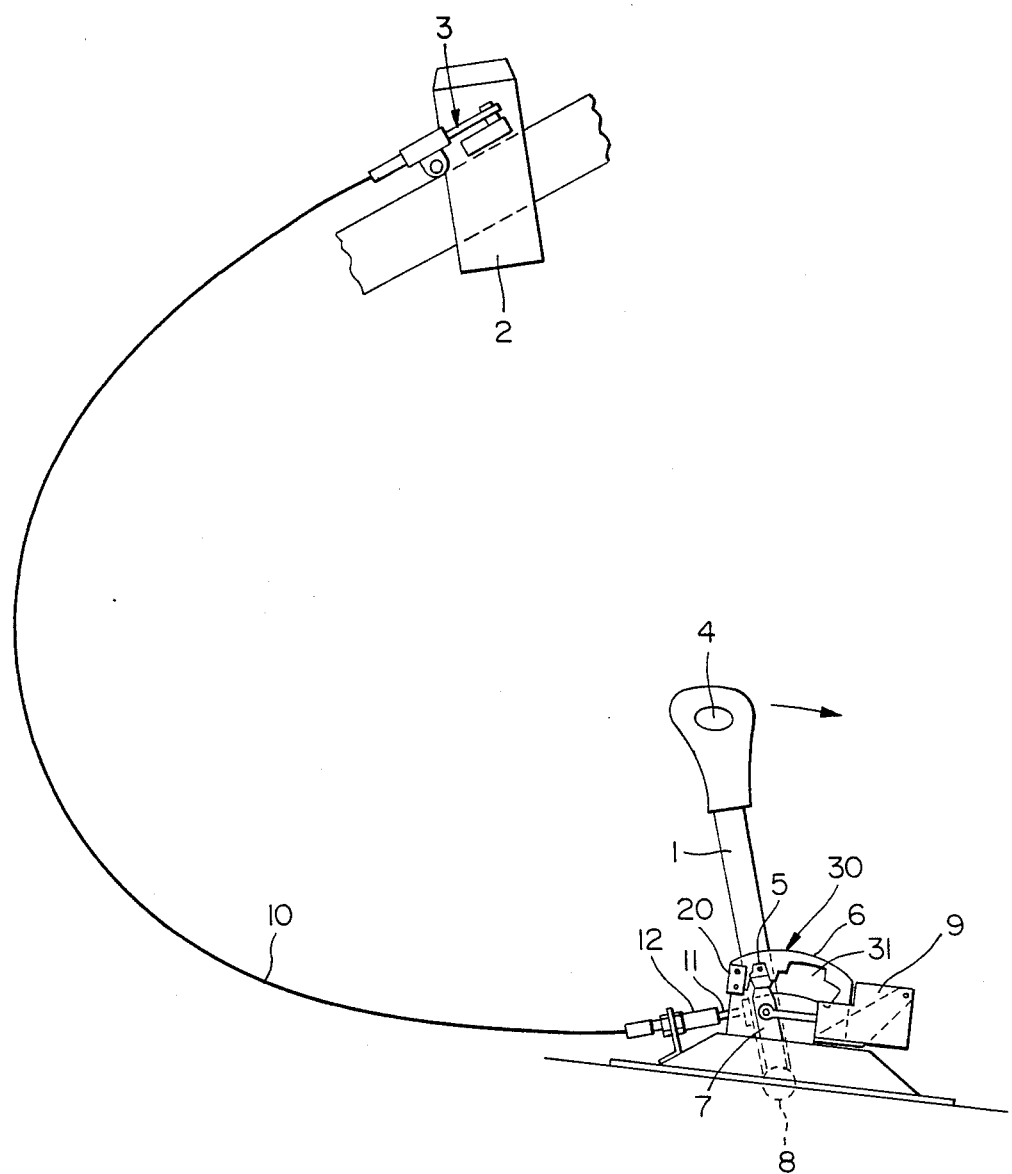
FIG. 1 is a schematic illustration showing a gear shift device according to one preferred embodiment of the present invention, with a released interlock and a locked shift lock mechanism.

Referring now to the drawings, and in particular to FIG. 1, a floor gear shift mechanism for a vehicle automatic transmission is shown. As is clear to those skilled in the art, the floor gear shift mechanism has a shift lever 1 operationally coupled to a linkage, which in turn is linked to a gear range selecting mechanism of an automatic transmission. The gear range selecting mechanism may be of any type well-known to those skilled in the art, and for this reason is not illustrated and described here. The gear shift mechanism further includes a positioning unit 30 which cooperates with the shift lever 1 to position the shift lever 1 at various angular positions when the automatic transmission is selectively shifted to desired gear ranges, such as first (1), second (2), drive (D), neutral (N), reverse (R) and park (P) gear ranges. The positioninq unit 30 comprises a locating pin 5, extending radially outwardly from the shift lever 1, and a locating plate 6, secured to the vehicle body. In the locating plate 6 is formed an opening 31 having locating steps which receive or engage the locating pin 5 to detain the shift lever 1 at selected angular positions corresponding to the gear range position selected.

The locating pin 5 is slid downwardly in the axial direction of the shift lever 1 by pushing a button 4. Button 4 is connected to the locating pin 5 through a conventional linkage (not shown). After pushing the button 4 and sliding the locating pin downwardly, shift lever 1 is pivoted about axis 8 into a desired gear range selecting position to shift the automatic transmission into the appropriate gear selecting range.

Figure 2:
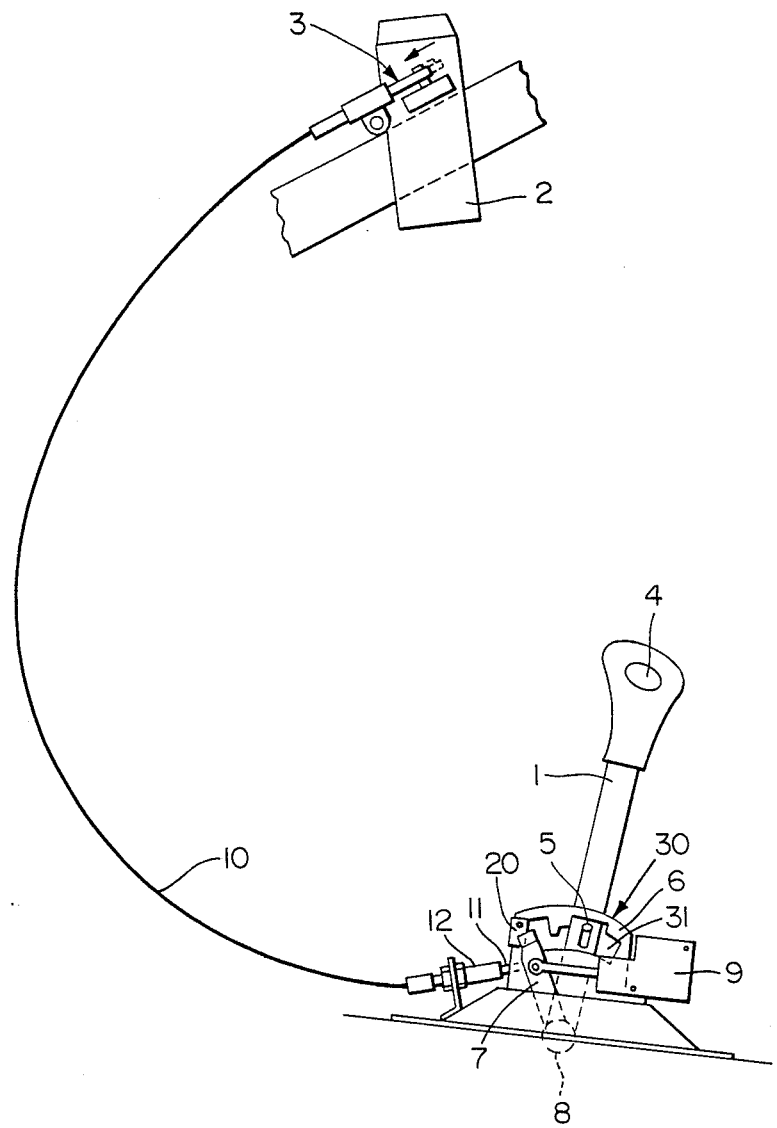
FIG. 2 is a view similar to FIG. 1, with a locked interlock mechanism and a released shift lock mechanism.

In association with the gear shift mechanism, a shift lock mechanism is provided. The shift lock mechanism comprises a lock lever 7 swingably mounted for movement about the pivot axis 8, and an electric actuator 9 for operating the lock lever 7. When the lock lever 7 is in a lock position, as shown in FIG. 1, the lock lever 7 prohibits the locating pin 5 from sliding downwardly. The shift lever 1 therefore is not permitted to move and shift the transmission from the park gear range. When the lock lever 7 is in an unlock position, the shift lever 1 is permitted to move and shift the transmission from the park gear range, as shown in FIG. 2.

Figure 3:
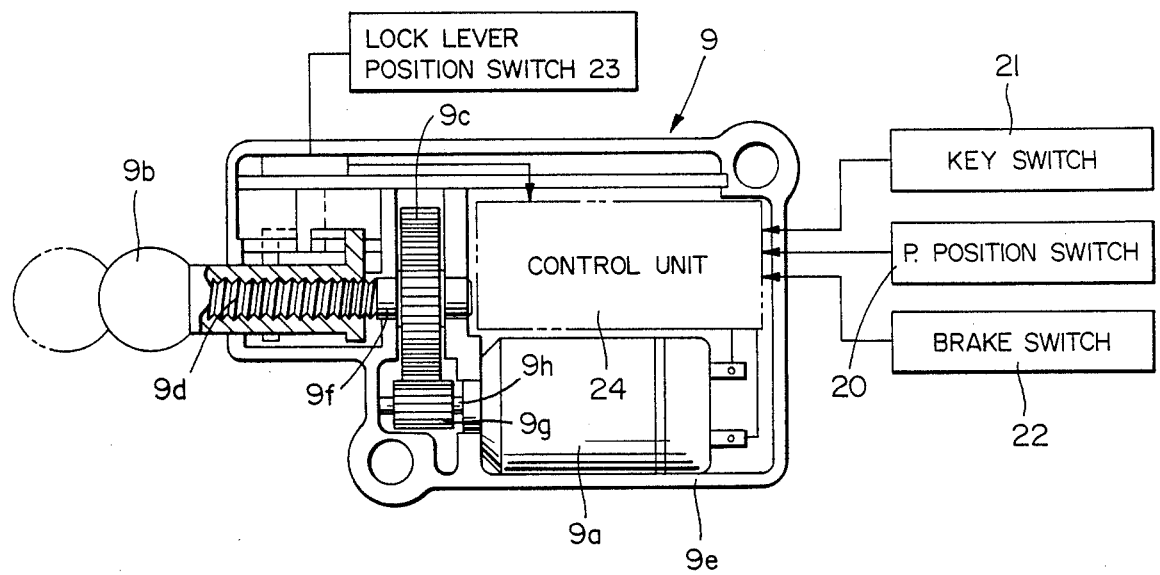
FIG. 3 is an enlarged sectional view showing an electric actuator.

Referring to FIG. 3, the electric actuator 9 is shown in detail. The electric actuator 9 consists of a reduction gear 9c rotatably mounted in housing 9e, a worm gear 9d formed on the outer surface of a worm gear shaft 9f, which is fixed to the reduction gear 9c, and an electric motor 9a. A pinion gear 9g is fixed on the end of output shaft 9h driven by the electric motor 9a. pinion gear 9g is engaged with the reduction gear 9c. As FIG. 3 shows, slide rod 9b is provided with internal threads engaged with the external threads of the worm gear 9d, and is slidably mounted in the housing 93.

Referring again to FIGS. 1 and 2, it can be seen that the end of slide rod 9b is connected to the lock lever 7. Rotation of the output shaft 9h by the motor 9a is transmitted to the worm gear shaft 9f via pinion gear 9g and reduction gear 9c. Through the cooperation of the internal threads of slide rod 9b and the external threads of worm gear 9d, rotation of the worm gear shaft 9f produces axial movement of the slide rod 9b. The axial movement of the slide rod 9b pivots the lock lever 7 about axis 8.

A control unit 24 is mounted in the housing of the electric actuator 9. The motor 9a is controlled by a signal from the control unit 24. The control unit 24 detects signals from a park position detecting switch 20, a key switch 21, a brake switch 22, and a lock lever position switch 23.

Figure 4:
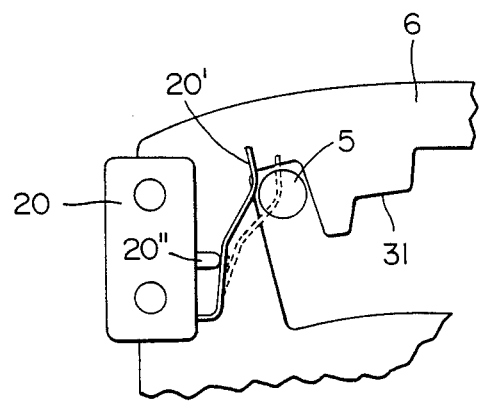
FIG. 4 is an enlarged view showing a parking position detecting switch.

Referring to FIG. 4, the park position detecting switch 20 is shown in detail. By pushing the button 4, the shift lever 1 can be moved to select the park position. The park position detection switch 20 is closed when the locating pin 5 pushes a detecting plate 20' into engagement with a contact 20''. Such engagement occurs after the button 4 is released and pin 5 is slid upwardly in the axial direction of shift lever 1.

Figure 7:
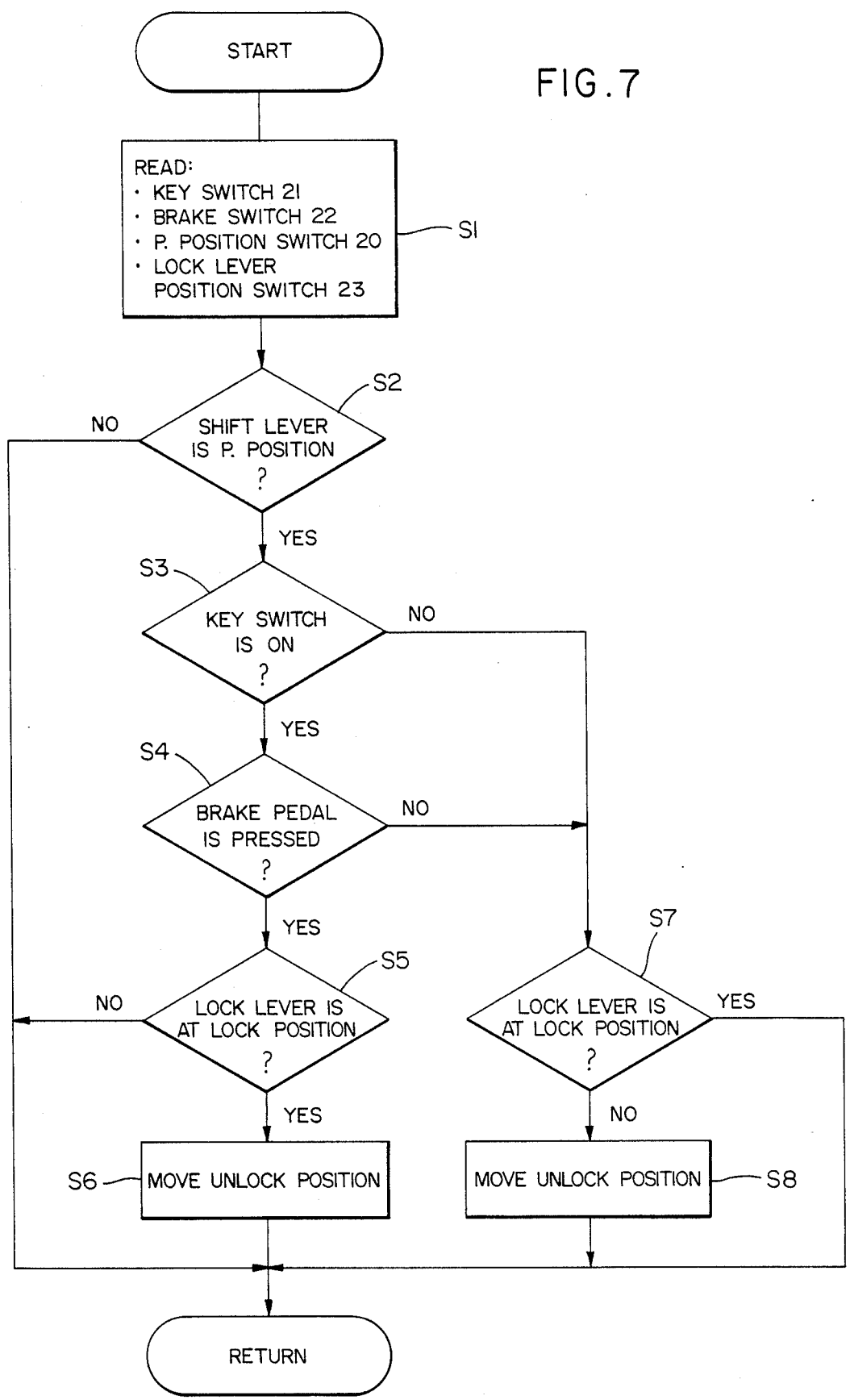
FIG. 7 is a flow chart showing the operation of a control unit.

The operation of control unit 24 will be described in detail with reference to the flow chart shown in FIG. 7. In the following description, the reference symbol "S" means step. The signals from the key switch 21, the brake switch 22, the park position switch 20, and the lock lever position switch 23 are read at S1. At S2, a determination is made as to whether the shift lever 1 is positioned so that the park gear range is selected. If the shift lever 1 is not positioned to select the park gear range, the motor 9e is not operated. If the shift lever 1 is positioned to select the park gear range, a determination is made as to whether or not the key switch 21 is turned to an ignition, or "ON" position at S3. If the key switch 21 is turned to the ignition, or "ON" position, a determination is made as to whether or not the brake pedal is pressed at S4. If the brake pedal is pressed, a determination is made at S5 as to whether or not the lock lever 7 is in a lock position. If the lock lever 7 is at the lock position at S5, the motor 9a is operated and the lock lever 7 is moved to an unlock position at S6. However, if the lock lever 7 is not in the lock position, the motor 9a is not operated.

If, at S3, the key switch 21 is not turned to the ignition, or "ON" position, or if, at S4, the brake pedal is not pressed, a determination is made at S7 as to whether the lock lever 7 is in the lock position. If the lock lever 7 is determined to be in the lock position at S7, the motor 9a is not operated. If, at S7, it is determined that the lock lever 7 is not in the lock position, the motor 9a is operated and the lock lever 7 is moved to the lock position at S8.

Figure 5A:
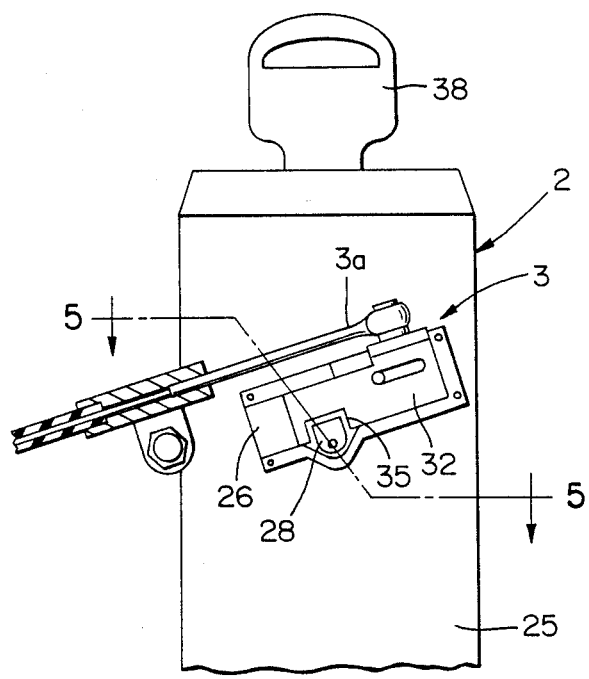
FIG. 5A is a schematic illustration, partially in section, of an interlock mechanism.

An interlock mechanism according to the present invention comprises a key lock mechanism 3, mounted on an ignition switch assembly 2, and a connecting cable 10 connecting the key lock mechanism 3 and the shift lever 1. The ignition switch assembly 2, which itself is well known in the art, is associated with the key lock mechanism 3. As is shown in detail in FIGS. 5A and 5B, the ignition switch assembly 2 has a key cylinder 25 and a mounting boss 26 formed integrally with the key cylinder 25. The mounting boss 26 has a bore 27 formed in the key cylinder 25 which extend radially relative to ignition switch assembly 2. The radial bore 27 slidably receives therein a lock pin 28. A cover plate 29 is mounted on the top surface of the mounting boss 26. A slide plate 32 is slidably mounted between the mounting boss 26 and the cover plate 29 and has a notch portion 35. The notch portion 35 is situated so that it corresponds with the lock pin 28 when the slide plate 32 is in the unlock position, as shown in FIG. 5A.

Figure 5B:
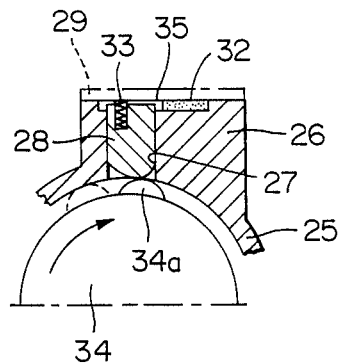
FIG. 5B is a cross-sectional view taken along the line V—V in FIG. 5A.

Between the cover plate 29 and the lock pin 28, a coil return spring 33 is disposed to bias the lock pin 28 downwardly, viewing FIG. 5B. The lock pin 28 is thereby brought into slidable engagement with a control cam 34 integrally formed with a cam lobe 34 a rotatably received in the key cylinder 25.

When slide plate 32 is in the unlock position, and an ignition switch key 38 is turned and positioned in a steering lock position, the cam 34 is turned in the clockwise direction as viewed in FIG. 5B, so that the cam lobe 34a pushes up the lock in pin 28 against the return spring 33 to slide the lock pin 28 up. An upper portion of the lock pin 28 thereby enters into notch portion 35. Conversely, when the slide plate 32 is in the lock position, the ignition switch key 38 cannot turn to the steering lock position from any one of the other key positions, such as an accessory position (ACC), and ignition position (ON) and a start and prove out position, because movement of the lock pin 28 is obstructed by slide plate 32, and the lock pin is thus prevented from sliding upwardly, viewing FIG. 5B.

Figure 6:
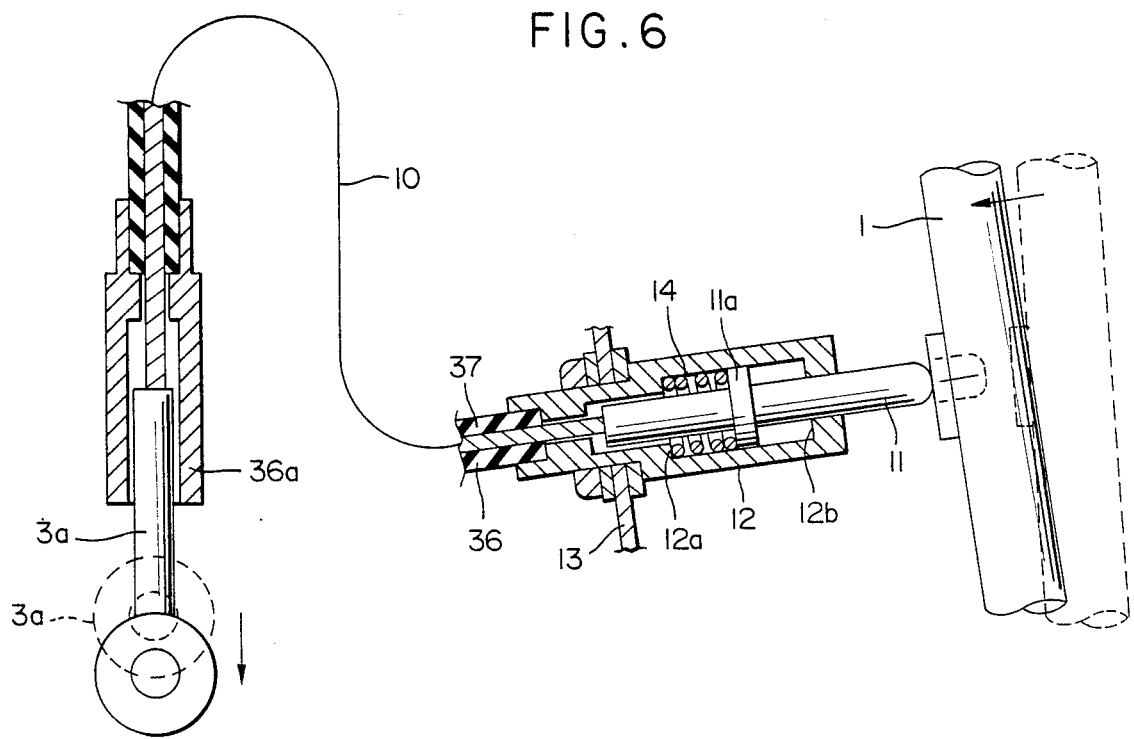
FIG. 6 is a schematic illustration, partially in section, of a connecting mechanism.

Referring to FIG. 6, the connecting cable 10 is shown in detail. The connecting cable 10 consists of an outer cable 36 and an inner cable 37 slidably received in the outer cable 36. One end of the outer cable 36 is connected with the key cylinder 25 through a bracket 36a. The other end of the outer cable 36 is connected with a cylindrical bracket 12 connected to the vehicle body through a bracket 13. As is clear from FIGS. 5 and 6, one end of the inner cable 37 is connected with the slide plate 32 through a connecting arm 3a. The other end of the inner cable 37 is connected with a push rod 11. The cylindrical bracket 12 slidably receives therein the push rod 11 which fixedly mounts or supports a spring retainer 11a. Between the spring retainer 11a and a shoulder 12a of the cylindrical bracket 12, a coil spring 14 is disposed to bias the push rod 11 outwardly, thereby bringing the spring retainer 11 into engagement with a shoulder 12b of the cylindrical bracket 12 so that the retainer 11a presses against the shoulder.

In operation, when the shift lever 1 is in the park position, as shown in solid lines in FIG. 6, the shift lever 1 pushes the push rod 11 against the force of coil spring 14 to push the push rod 11, thereby moving the slide plate 32 to the unlock position. On the other hand, when the shift lever 1 is in one of its other shift positions, so as to shift the transmission into one of the first (1), second (2), drive (D), neutral (N), and reverse (R) gear ranges, as shown in FIG. 6 by broken lines, the shift lever 1 is disconnected from the push rod 11 and the push rod 11 is moved outwardly relative to bracket 12 by the coil spring 14. The slide plate 32 is thereby moved to the lock position. It should therefore be clear that the ignition switch key 38 can be pulled out of the ignition switch assembly 2 only when the shift lever 1 is in the park position, and that the shift lever 1 cannot be moved from the park position when the ignition switch key 38 is pulled out of the ignition switch assembly 2. If the ignition switch key 38 is set and turned to the ignition, or "ON", position, the shift lever 1 is still unable to be moved from the park position when the brake pedal is not pressed. Thus, the gear shift device provides both an interlock mechanism and a shift lock mechanism and is simply constructed. Safety is greatly improved.

Figure 8A:
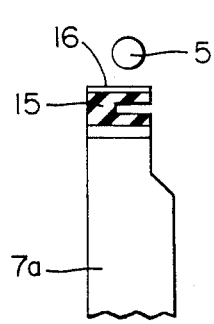
FIGS. 8A and 8B are enlarged views showing one embodiment of a shift lock lever.
Figure 8B:
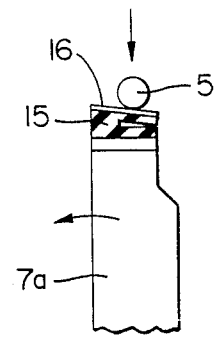

Referring now to FIG. 8, a modified lock lever 7a is illustrated. The lock lever 7a has a C-shaped rubber block 15 fixed on its top surface. A metal plate 16 is fixed on the top surface of the rubber block 15. Therefore, when the button 4 is pushed with a heavy operating force, the metal plate 16 is tilted as indicated by the arrow in FIG. 8(B), and the lock lever is moved by the operating force to the unlock position. In this manner, if the electric actuator 9 or the control unit 24 breaks, a driver can shift the shift lever forcibly and move the vehicle.

Figure 9A:
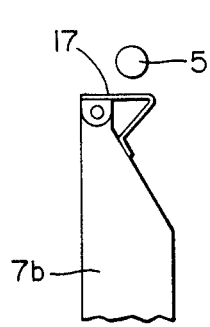
FIGS. 9A and 9B are enlarged views showing another embodiment of the shift lock lever.
Figure 9B:
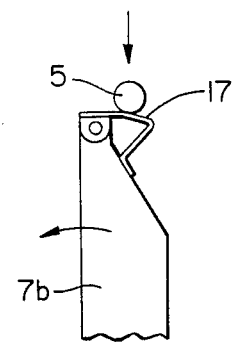

FIG. 9 shows a modified lock lever 7b of which the major components are substantially identical in operation and structure to those of the embodiment of FIG. 8. The difference here is that the lock lever 7b has a spring plate 17 fixed on the top portion of the lock lever 7b. The spring plate 17 is set horizontally, but is tilted as shown in FIG. 9(B) when the button 4 is pushed with a heavy forcible operating force.

Figure 10A:
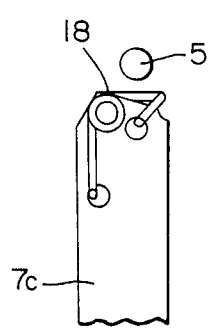
FIGS. 10A and 10B are enlarged views showing still another embodiment of the shift lock lever.
Figure 10B:
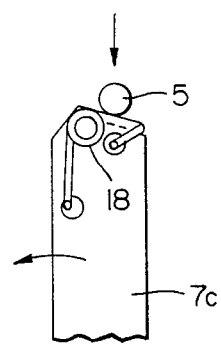

FIG. 10 shows another modified lock lever 7c of which the major components are substantially identical in operation and structure to those of the embodiment of FIG. 8. However, in the modified lock lever of FIG. 10, the top surface of the lock lever 7c is inclined and the lock lever has a spring bar 18 fixed on its top portion. The spring bar 18 is set horizontally. Therefore, when the button 4 is pushed with a heavy operating force, the spring bar 18 bends downwardly and the locating pin 5 contacts the top surface of the lock lever 7c.

Although the present invention has been fully described by way of specific embodiments thereof, which are applied to an automotive vehicle equipped with an automatic transmission, it will be understood that various changes may be made in the form, details, arrangement and proportions of the parts. For example, it is permissible to replace the connecting cable 10 with a connecting linkage. It will be understood that unless such changes and modifications depart from the scope of the present invention, they should be construed to be included therein.

What is claimed is:

1. A gear shift device for a vehicle automatic transmission, comprising:

(a) a manually operated shift lever for placing an automatic transmission of an automotive vehicle in a desired gear range;
(b) ignition switch means operated so as to be turned on by an ignition switch key;
(c) interlock means for obstructing removal of said ignition switch key from said ignition switch means when said shift lever is not positioned so that a park range is selected;
(d) mechanical connecting means for connecting said interlock means and said shift lever mechanically, and for transmitting movement of the shift lever to the interlock means:
(e) shift lock means for locking said shift lever in a position retaining said automatic transmission in a park gear range;
(f) an electric actuator for moving said shift lock means into one of a lock position and an unlock position;
(g) brake detecting means for detecting whether a brake pedal is pressed or not;
(h) control means for controlling said electric actuator in response to signals from the ignition switch means and said brake detecting means, such that said shift lock means is moved to the unlock position when said ignition switch means is turned on and said brake pedal is pressed.

2. A gear shift device in accordance with claim 1, in which said electric actuator includes an electric motor.

3. A gear shift device in accordance with claim 2, and further comprising park gear range detecting means for detecting whether said shift lever has placed said transmission in said park gear range, and wherein said control means controls said electric motor in response to signals from the ignition switch means, the brake detecting means and the park range detecting means such that said shift lock means is moved to the unlock position when said ignition switch means is on, said brake pedal is pressed and the shift lever has placed said transmission in the park gear range.

4. A gear shift device in accordance with claim 3, wherein said control means controls said electric motor in response to signals from the brake detecting means and the park range detecting means such that said shift lock means is moved to the lock position when said brake pedal is not pressed and said shift lever has placed said transmission in the park gear range.

5. A gear shift device in accordance with claim 4, wherein said mechanical connecting means is pushed by said shift lever when said transmission is in the park gear range, and transmits only movement of the shift lever to said interlock means.

6. A gear shift device in accordance with claim 1 in which said mechanical connecting means is pushed by said shift lever when said transmission is in the park gear range and transmits only movement of the shift lever to said interlock means.

7. A gear shift device in accordance with claim 6 in which said mechanical connecting means includes a connecting cable.

8. A gear shift device in accordance with claim 7 in which said interlock means obstructs turning of said ignition switch means to a steering lock position when said transmission is in the park gear range.

* * * * *